United States Patent
Hamada

(10) Patent No.: US 11,082,093 B2
(45) Date of Patent: Aug. 3, 2021

(54) COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/386,701

(22) Filed: Apr. 17, 2019

(65) Prior Publication Data

US 2019/0245586 A1    Aug. 8, 2019

Related U.S. Application Data

(63) Continuation of application No. 14/762,706, filed as application No. PCT/JP2014/055705 on Feb. 27, 2014, now abandoned.

(30) Foreign Application Priority Data

Mar. 18, 2013   (JP) ................................. 2013-055417

(51) Int. Cl.
  *H04B 5/00*    (2006.01)
  *H02J 50/80*   (2016.01)
  (Continued)

(52) U.S. Cl.
  CPC ............ *H04B 5/0037* (2013.01); *H02J 7/042* (2013.01); *H02J 50/10* (2016.02); *H02J 50/12* (2016.02); *H02J 50/80* (2016.02); *H04W 4/80* (2018.02)

(58) Field of Classification Search
  CPC ....................................................... H02J 50/10
  See application file for complete search history.

(56) References Cited

U.S. PATENT DOCUMENTS

2006/0158152 A1    7/2006   Taniguchi et al.
2008/0231421 A1    9/2008   Tuttle
  (Continued)

FOREIGN PATENT DOCUMENTS

JP    2008-113519 A    5/2008
JP    2009-247125 A    10/2009
  (Continued)

OTHER PUBLICATIONS

ISO/IEC 18092, "Information technology—Telecommunications and information exchange between systems—Near Held Communication—Interface and Protocol" (NFCIP-1) Apr. 2004, pp. 1-58.
  (Continued)

*Primary Examiner* — Drew A Dunn
*Assistant Examiner* — Tynese V McDaniel
(74) *Attorney, Agent, or Firm* — Venable LLP

(57) ABSTRACT

A communication apparatus includes communication means for performing radio communication with a partner apparatus, and supply means for wirelessly supplying power to the partner apparatus. The communication apparatus acquires information on a communication circuit for radio communication in the partner apparatus, and controls the supply means so as to determine an amount of power to be supplied per unit time depending on the information.

11 Claims, 12 Drawing Sheets

(51) Int. Cl.
    *H02J 50/10*      (2016.01)
    *H02J 50/12*      (2016.01)
    *H04W 4/80*       (2018.01)
    *H02J 7/04*       (2006.01)

(56) References Cited

U.S. PATENT DOCUMENTS

| | | | |
|---|---|---|---|
| 2010/0148085 A1 | 6/2010 | Yoshida et al. | |
| 2010/0207575 A1* | 8/2010 | Pijnenburg | H02J 7/022 320/108 |
| 2011/0025264 A1 | 2/2011 | Mochida et al. | |
| 2011/0136550 A1 | 6/2011 | Maugars | |
| 2012/0248891 A1* | 10/2012 | Drennen | H02J 50/12 307/104 |
| 2012/0256495 A1 | 10/2012 | Fukaya | |
| 2013/0207599 A1* | 8/2013 | Ziv | H02J 5/005 320/108 |
| 2014/0015522 A1 | 1/2014 | Widmer et al. | |
| 2014/0306650 A1* | 10/2014 | Akiyoshi | H02J 7/0077 320/107 |
| 2015/0171933 A1 | 6/2015 | Hamada | |
| 2015/0194814 A1 | 7/2015 | Taylor et al. | |

FOREIGN PATENT DOCUMENTS

| | | |
|---|---|---|
| JP | 2009-253649 A | 10/2009 |
| JP | 2010-158515 A | 7/2010 |
| JP | 2011-078191 A | 4/2011 |
| JP | 2012-222946 A | 11/2012 |
| WO | 2007/089086 A1 | 8/2007 |
| WO | 2009/050624 A2 | 4/2009 |
| WO | 2009/050625 A2 | 4/2009 |
| WO | 2009/123077 A1 | 10/2009 |

OTHER PUBLICATIONS

ISO/IEC 21481, " Information technology—Telecommunications and information exchange between systems—Near Held Communication—Interface and Protocol—2" (NFCIP-2) Jan. 2005, pp. 1-5.

* cited by examiner

COMMUNICATION APPARATUS, METHOD OF CONTROLLING THE SAME, AND STORAGE MEDIUM

This application is a continuation of application Ser. No. 14/762,706, filed Jul. 22, 2015, which is a continuation of PCT Application No. PCT/JP2014/055705, filed on Feb. 27, 2014.

BACKGROUND OF THE INVENTION

Field of the Invention

The present invention relates to a power supply control technique for power transmission in a communication apparatus that performs radio communication and power transmission.

Background Art

NFC (Near Field Communication) techniques are conventionally known as near field radio communication techniques between communication apparatuses using electromagnetic coupling (See ISO/IEC 18092, "Near Field Communication-Interface and Protocol" NFCIP-1, and ISO/IEC 21481, "Near Field Communication-Interface and Protocol-2", NFCIP-2). Furthermore, contactless power transmission techniques are known that supply power to a wireless communication partner apparatus, using induced electromotive force in order to charge a secondary battery disposed in the partner apparatus or receive power from the partner apparatus.

Here, communication apparatuses have been conventionally considered that include a communication circuit such as an NFC circuit, and a contactless power transmission circuit, and that wirelessly perform the transmission of information and the transmission of power together without contact (see Japanese Patent Laid-Open No. 2009-253649 and Japanese Patent Laid-Open No. 2009-247125). There is the problem that if such communication apparatuses are configured so that a communication circuit and a power transmission circuit operate independently, electromagnetic induction in the contactless power transmission circuit becomes a noise source for the radio communication in the communication circuit, and thus leads to the degradation of communication quality. Furthermore, there may be the risk that electronic elements constituting an NFC communication function unit are damaged due to an increase in electromagnetic inductive power when the power transmission circuit transmits a large amount of power due to fast charging or the like to a secondary battery in such a communication apparatus.

In contrast to this, Japanese Patent Laid-Open No. 2009-253649 and Japanese Patent Laid-Open No. 2009-247125 describe a control method for configuring a communication circuit and a power transmission circuit so as to be operable in cooperation with each other, setting a period of operation of the communication circuit and a period of operation of the power transmission circuit during a prescribed period, and operating the respective circuits in a time-division manner. For example, there is a description of the execution of time-division exclusive control in which the power transmission circuit is not operated during periods in which the communication circuit is operated, by performing the control of sharing information on the periods of operation of the communication circuit via a radio communication link between communication apparatuses.

Furthermore, Japanese Patent Laid-Open No. 2008-113519 discloses a control method for transmitting "a charging start command" to an opponent communication apparatus at the start of contactless power transmission, and increasing electric field strength to supply at the time of receiving "a charging start response" from the opponent communication apparatus side. For example, in the technique disclosed in Japanese Patent Laid-Open No. 2008-113519, only when "a charging start response" can be properly received, control is performed so as to perform power transmission with the amount of power notified by the "response" and not to perform charging when the response cannot be received.

However, even for a communication apparatus implementing cooperative operation of near field radio communication and contactless power transmission (blocking the connection with an antenna (induction coil), or the like), a case can be conceived in which radio communication and power transmission are executed between the apparatus and a communication apparatus that does not implement this. In such a situation, there is the problem that if contactless power transmission is performed, there may be cases where an overcurrent is generated in an electric circuit for near field communication in a partner apparatus depending on power transmitted by a power transmitting side communication apparatus, and in some cases, component parts of the electric circuit for near field communication may be damaged.

The present invention has been made in view of the above-described problem. There is provided a communication apparatus that performs radio communication and power transmission. The communication apparatus supplies power suitable for the partner apparatus.

SUMMARY OF INVENTION

According to one aspect of the present invention, there is provided a communication apparatus including communication means for performing radio communication with a partner apparatus, and supply means for wirelessly supplying power to the partner apparatus, the communication apparatus comprising: acquisition means for acquiring information on a state of a communication circuit for radio communication in the partner apparatus; and control means for controlling the supply means so as to determine an amount of power to be supplied per unit time depending on the information.

According to another aspect of the present invention, there is provided a method of controlling a communication apparatus including communication means for performing radio communication with a partner apparatus, and supply means for wirelessly supplying power to the partner apparatus, the method comprising: acquiring information on a state of a communication circuit for radio communication in the partner apparatus; and controlling the supply means so as to determine an amount of power to be supplied per unit time depending on the information.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention, and together with the description, serve to explain the principles of the invention.

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

(System Configuration)

Figure 1:
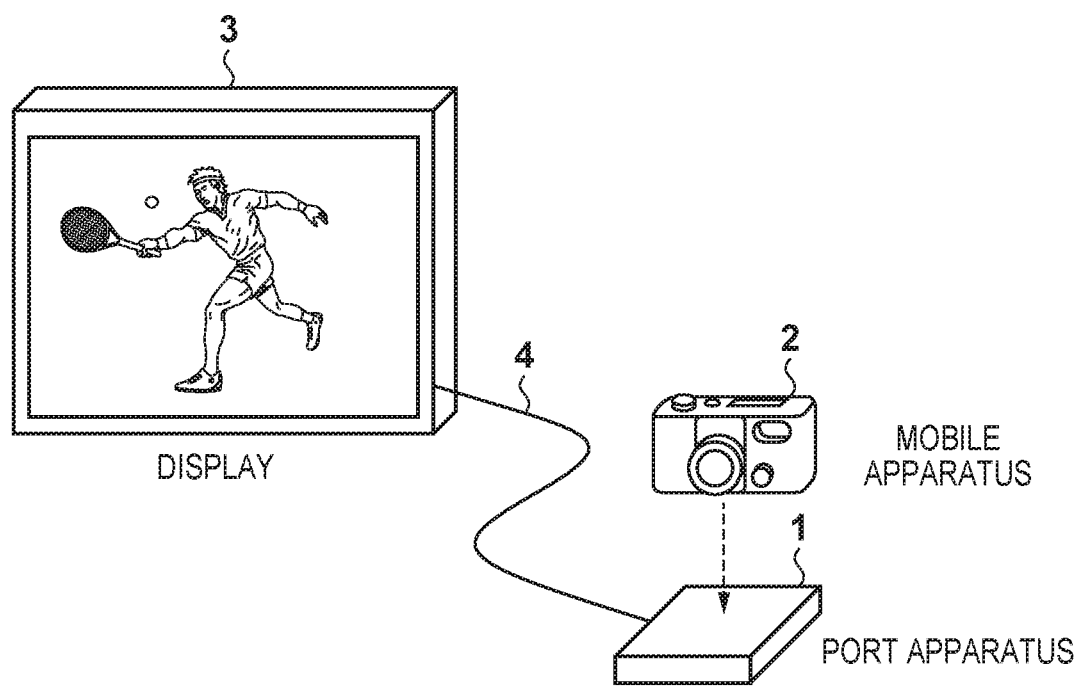
FIG. 1 is a view showing a configuration example of a communication system.

FIG. 1 shows a view showing a configuration example of a communication system. The communication system in FIG. 1 includes a port apparatus 1 serving as a communication apparatus, a mobile apparatus 2 serving as a partner apparatus for performing radio communication with the port apparatus 1, and a display 3 connected to the port apparatus 1 with a wired communication link (cable 4). The port apparatus includes an NFC (Near Field Communication) communication circuit as a communication circuit for near field radio communication using electromagnetic coupling. In addition, the port apparatus 1 includes, as a contactless power transmission circuit, a charging power supply circuit wirelessly supplying power to the partner apparatus. The mobile apparatus 2 may be a digital camera or the like, and includes an NFC communication circuit, like the port apparatus 1. In addition, the mobile apparatus 2 includes, as a contactless power transmission circuit, a power receiving circuit wirelessly receiving power for charging. The display 3 is connected to the port apparatus 1 via the cable 4 so as to be able to communicate with the port apparatus 1.

By the configuration as shown in FIG. 1, images stored in the mobile apparatus 2, for example, are transmitted to the port apparatus 1 by merely bringing the mobile apparatus 2 close to the port apparatus 1. As a result, a user can easily display, on the display 3, the images stored in the mobile apparatus 2. Furthermore, it is also possible to charge a secondary battery in the mobile apparatus 2 with power wirelessly supplied from the port apparatus 1.

(Functional Configuration of the Communication Apparatus and the Partner Apparatus)

Figure 2:
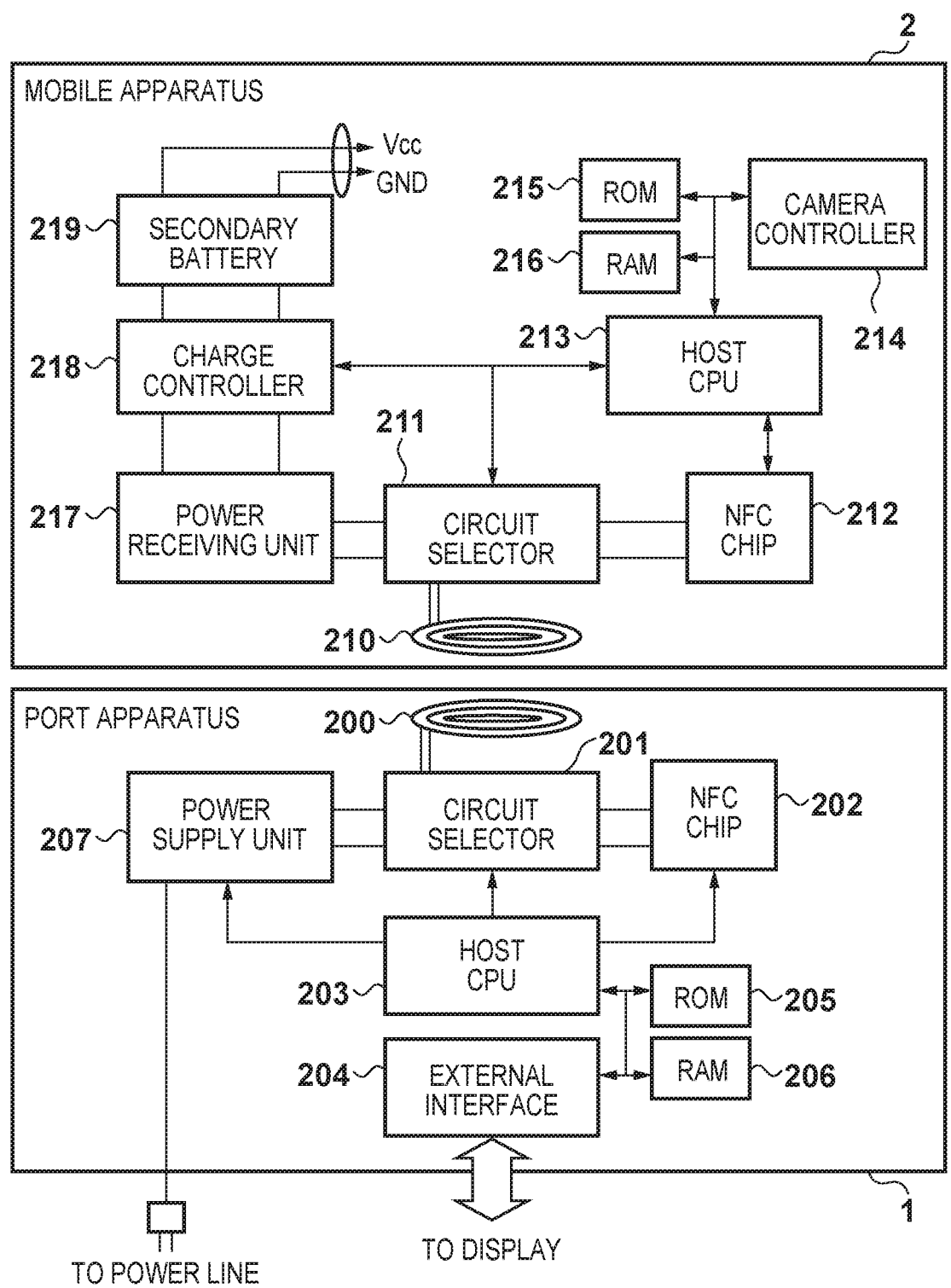
FIG. 2 is a block diagram showing a functional configuration example of a communication apparatus and a partner apparatus.

FIG. 2 is a block diagram showing a functional configuration example of the port apparatus 1 (communication apparatus) and the mobile apparatus 2 (partner apparatus). In FIG. 2, the port apparatus 1 includes an electromagnetic induction coil 200 for both radio communication and contactless power transmission, a circuit selector 201, an NFC chip 202, and a power supply unit 207. Similarly, the mobile apparatus 2 includes an electromagnetic induction coil 210, a circuit selector 211, an NFC chip 212, and a power receiving unit 217. The mobile apparatus 2 further includes a charge controller 218 and a secondary battery 219. These functional units are controlled by host CPUs 203 and 213. For example, the host CPUs 203 and 213, respectively execute programs stored in ROMs 205 and 215, and let RAMS 206 and 216 temporarily store data and the like generated during the execution of the programs. In addition, the RAMS 206 and 216 also temporarily store, for example, images captured by the mobile apparatus 2 and obtained via a camera controller 214 that are to be transmitted by near field radio communication, or data such as the images received from the mobile apparatus 2 by near field radio communication. Data received by the port apparatus 1 from the mobile apparatus 2 is transmitted to the display 3 via an external interface 204 by wired communication after being stored in the RAM 206, for example.

The host CPUs 203 and 213, respectively control the circuit selectors 201 and 211, and connect the coils 200 and 210 to the NFC chips 202 and 212 during a communication period during which the NFC chips 202 and 212 perform radio communication. Furthermore, the host CPUs 203 and 213 respectively connect the coils 200 and 210 to the power supply unit 207 and the power receiving unit 217 during a non-communication period during which the NFC chips 202 and 212 do not communicate. The communication period and non-communication period are periodically alternately switched, for example. Near field radio communication of the NFC chips 202 and 212, and power transmission of the power supply units 207 and the power receiving unit 217 are alternately executed in a time-division manner in synchronization with these periods.

Figure 3:
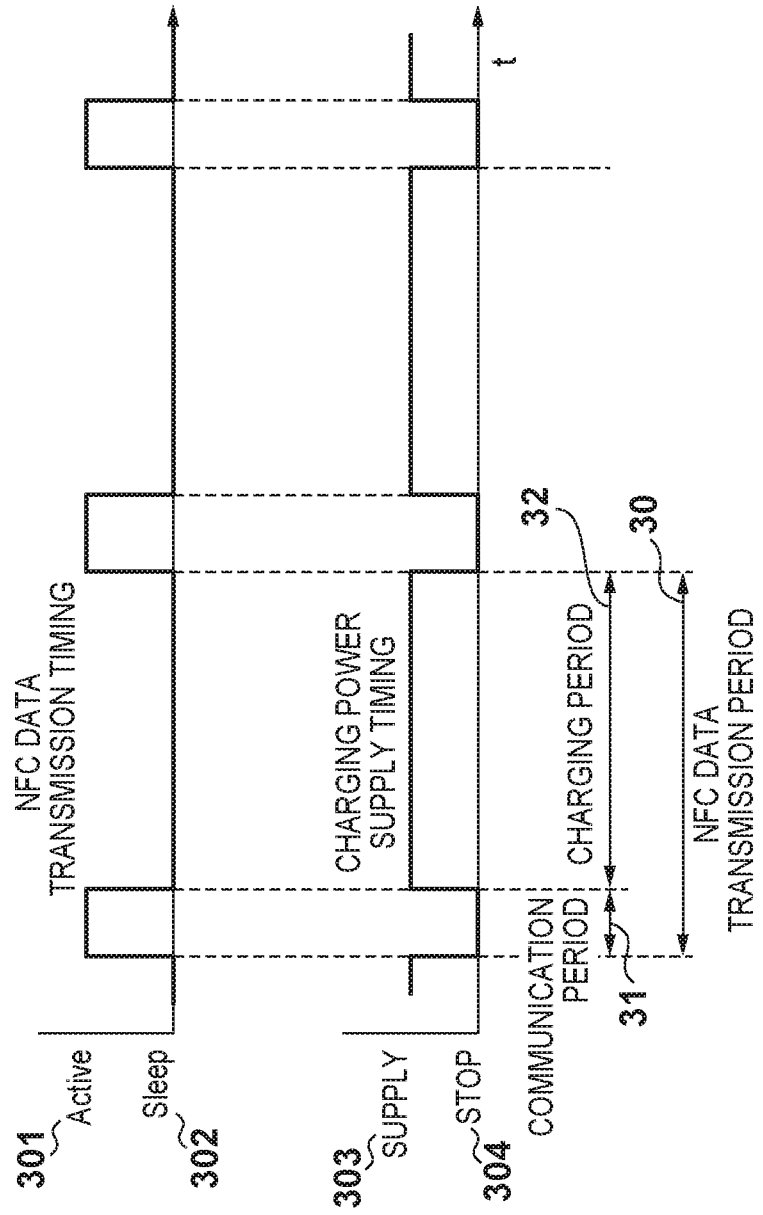
FIG. 3 is a conceptual diagram of time-division processing of radio communication and power transmission.

FIG. 3 shows this state, and shows a state where radio communication indicated in the upper part and power transmission indicated in the lower part are alternately periodically executed. The upper part in FIG. 3 indicates whether data is transmitted from the mobile apparatus 2 to the port apparatus 1. Specifically, reference numeral 301 represents an active state where data is transmitted from the mobile apparatus 2 to the port apparatus 1. Reference numeral 302 represents a sleep state where no data is transmitted from the mobile apparatus 2 to the port apparatus 1. As indicated in the upper part in FIG. 3, the port apparatus 1 and the mobile apparatus 2 are controlled so as to repeat the active state with a constant transmission period (NFC data transmission period) 30. In the NFC data transmission period 30, a communication period 31 (a period during which the state is active) may be changed according to the amount of data (information amount) transmitted between the mobile apparatus 2 and the port apparatus 1.

On the other hand, the chart in the lower part in FIG. 3 indicates the timing of charging the secondary battery 219 in the mobile apparatus 2 by transmitting power by power transmission. In the chart in the lower part in FIG. 3, reference numeral 303 indicates a state where the port apparatus 1 supplies power to the mobile apparatus 2, and the secondary battery on the mobile apparatus side is charged. Reference numeral 304 indicates a state where the port apparatus 1 stops supplying power to the mobile apparatus 2, and the secondary battery on the mobile apparatus side is not charged. In the present embodiment, in this way, a period (non-communication period 32) other than a communication period in the NFC data transmission period 30 during which radio communication is performed is assigned as a power transmission period.

Referring back to FIG. 2, in the configuration in FIG. 2, the mobile apparatus 2 uses one coil 210 for both radio communication and power transmission. Because of this, the electromotive force generated in the coil 210 by power transmission is not transmitted to the NFC chip 212 due to the operation of the circuit selector 211. That is, the mobile apparatus 2 in FIG. 2 is in a state where the operation of a power supply circuit including the coil 200 and the power supply unit 207 does not affect the NFC communication circuit. Hereinafter, in this manner, a circuit in which a communication circuit is not affected by the operation of a power receiving circuit is referred to as a circuit "that can block" power due to power transmission in the communication circuit.

Figure 5:
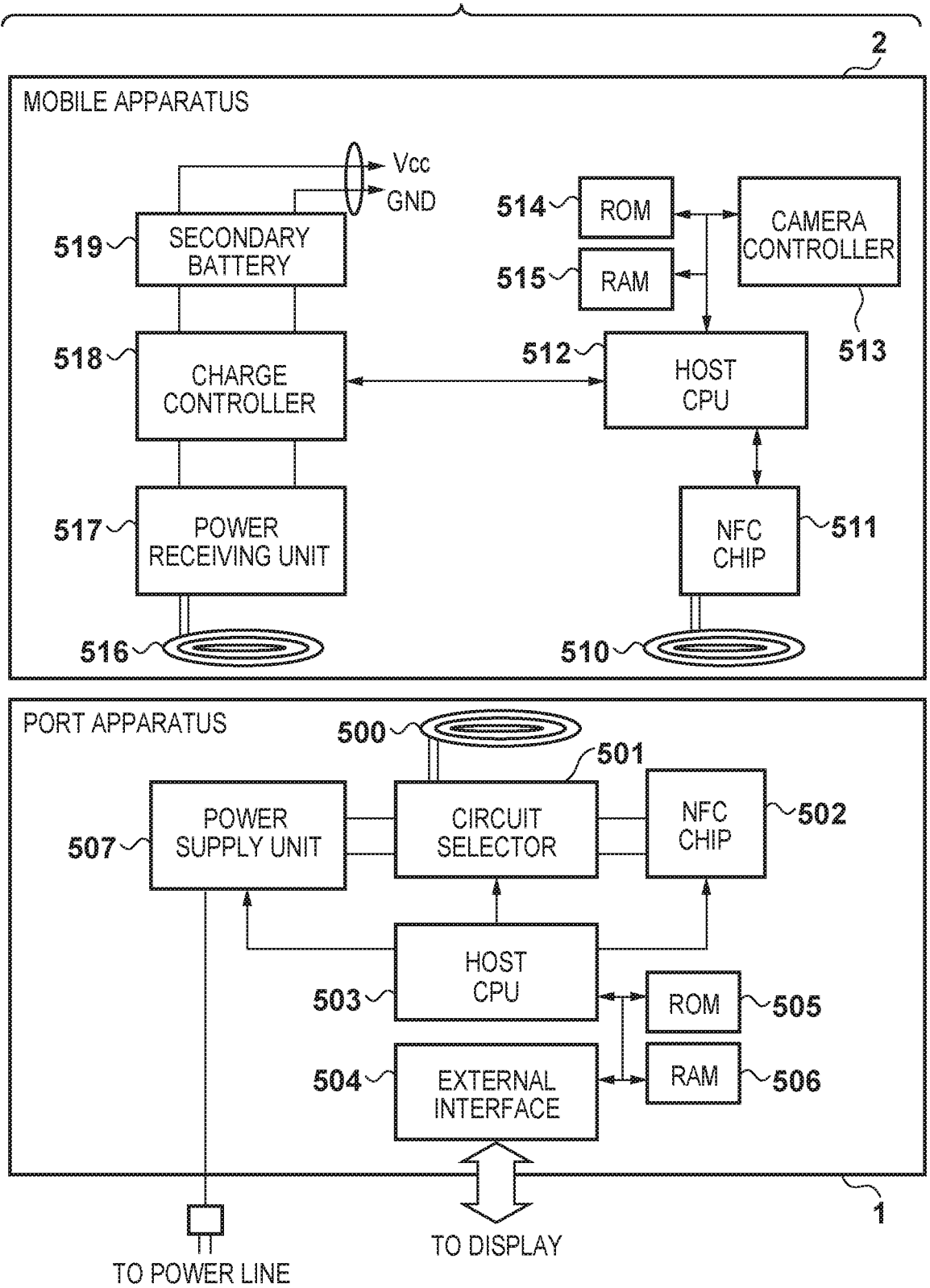
FIG. 5 is a block diagram showing a functional configuration example of a communication apparatus and a partner apparatus.

In contrast to this, for example, a circuit as in FIG. 5 is referred to as a circuit "that cannot block" power due to power transmission in a communication circuit. In FIG. 5, the mobile apparatus 2 includes an induction coil 510 dedicated to a radio communication circuit, and an induction coil 516 dedicated to a contactless power transmission circuit. These respective coils are connected to an NFC chip 511 and a power receiving unit 517 without interposing a circuit selector. Because of this, when a circuit selector 501 transmits power by connecting a power supply unit 507 to a coil 500 in the port apparatus 1, an electromotive force can be generated not only in the coil 516 but also in the coil 510 in the mobile apparatus 2. Then, this electromotive force is transmitted to the NFC chip 511 as it is, and in some cases may affect the NFC chip 511. That is, the mobile apparatus 2 in FIG. 5 is in a state where the NFC communication circuit can be affected by the operation of a power supply circuit including the coil 500 and the power supply unit 507.

In this way, if the port apparatus 1 supplies power having a large amount of power per unit time, to the circuit as in FIG. 5 that cannot block power, there may be the risk that parts of the NFC communication circuit are damaged. Therefore, in the present embodiment, the port apparatus 1 determines whether the NFC communication circuit in the partner apparatus for communication can be affected due to power transmission, and controls the amount of power supply per unit time according to a result of the determination. Furthermore, in some cases, the port apparatus 1 stops supplying power. Thus, for example, it is possible to prevent supplying excessive power to the NFC communication circuit in the partner apparatus. Hereinafter, the operation of the port apparatus 1 (communication apparatus) will be described in detail.

(Operation of the Communication Apparatus)

Figure 4:
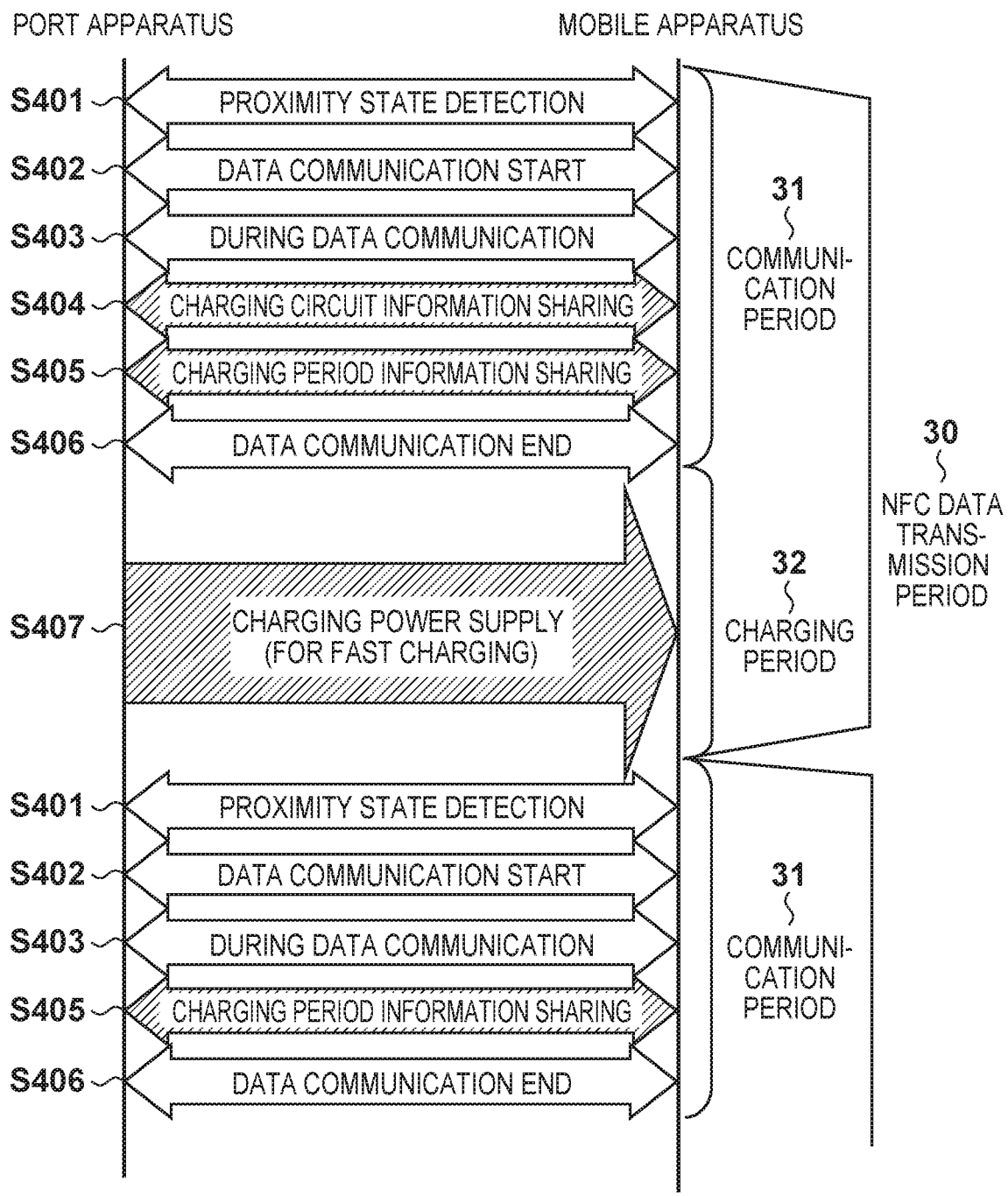
FIG. 4 is a sequence chart showing processing between a communication apparatus and a partner apparatus in a case where the impact of power transmission can be blocked in the partner apparatus.
Figure 6:
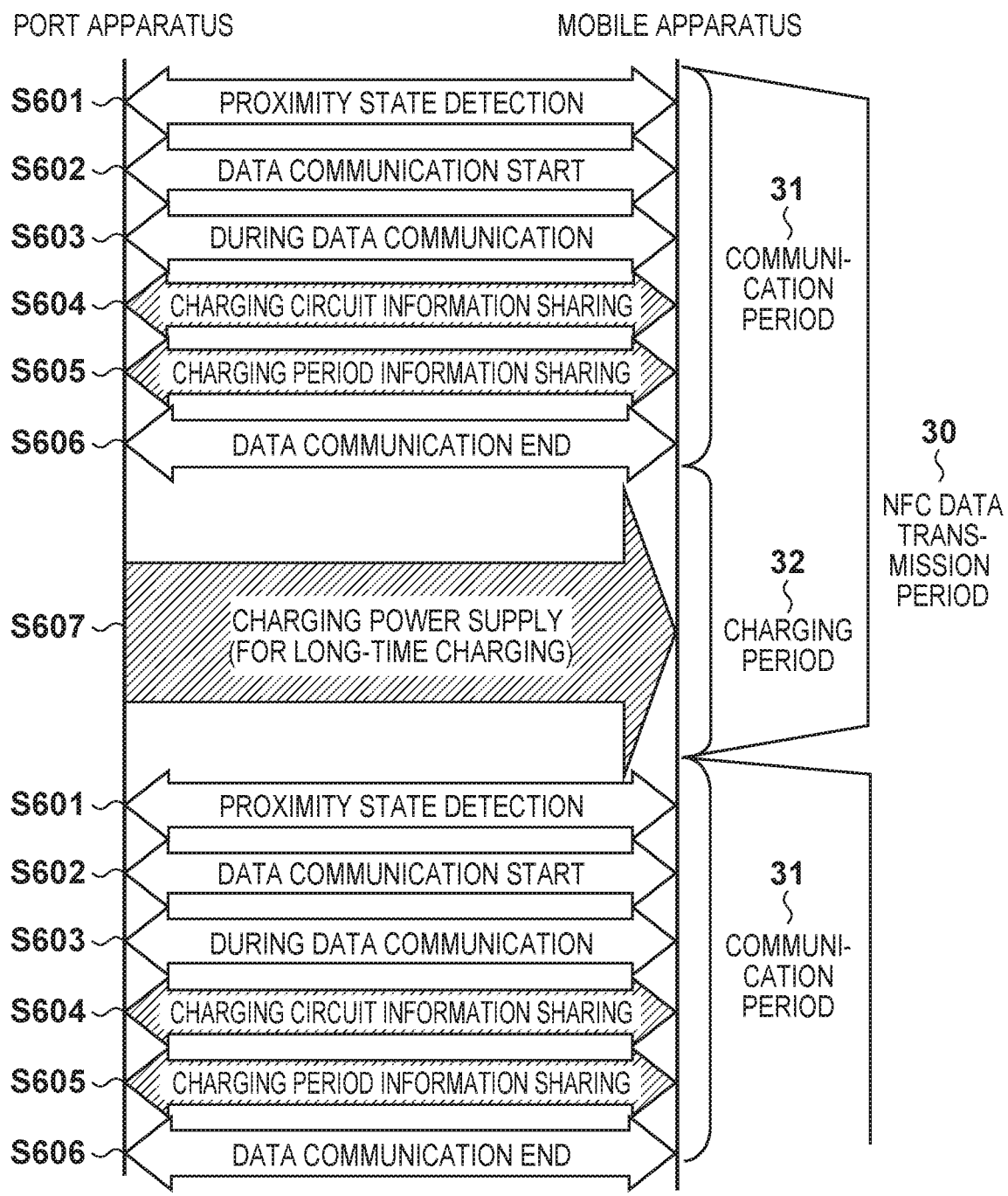
FIG. 6 is a sequence chart showing processing between a communication apparatus and a partner apparatus in a case where the impact of power transmission cannot be blocked in the partner apparatus.
Figure 7:
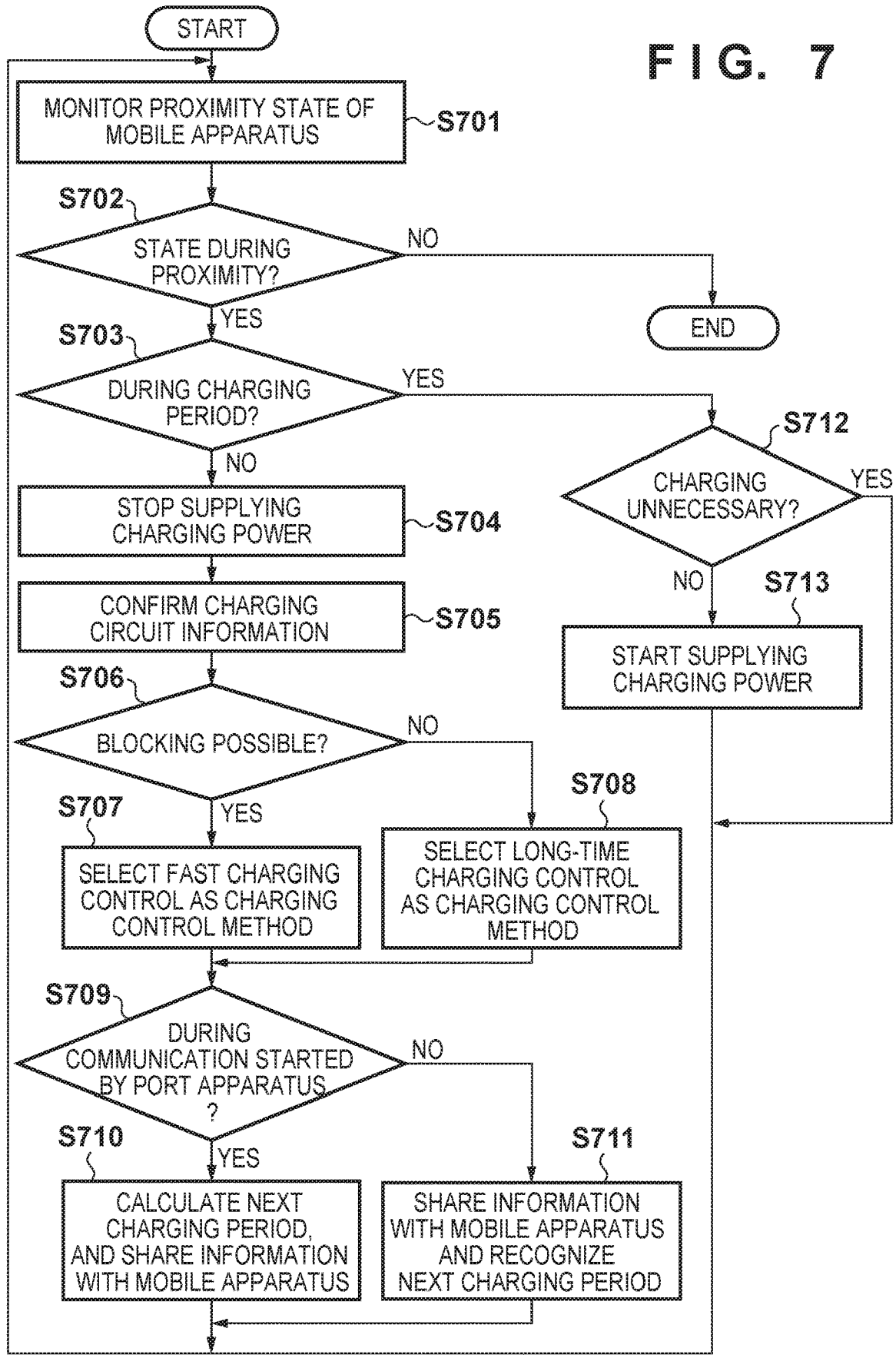
FIG. 7 is a flow chart showing the operation of power supply processing in a communication apparatus.
Figure 8:
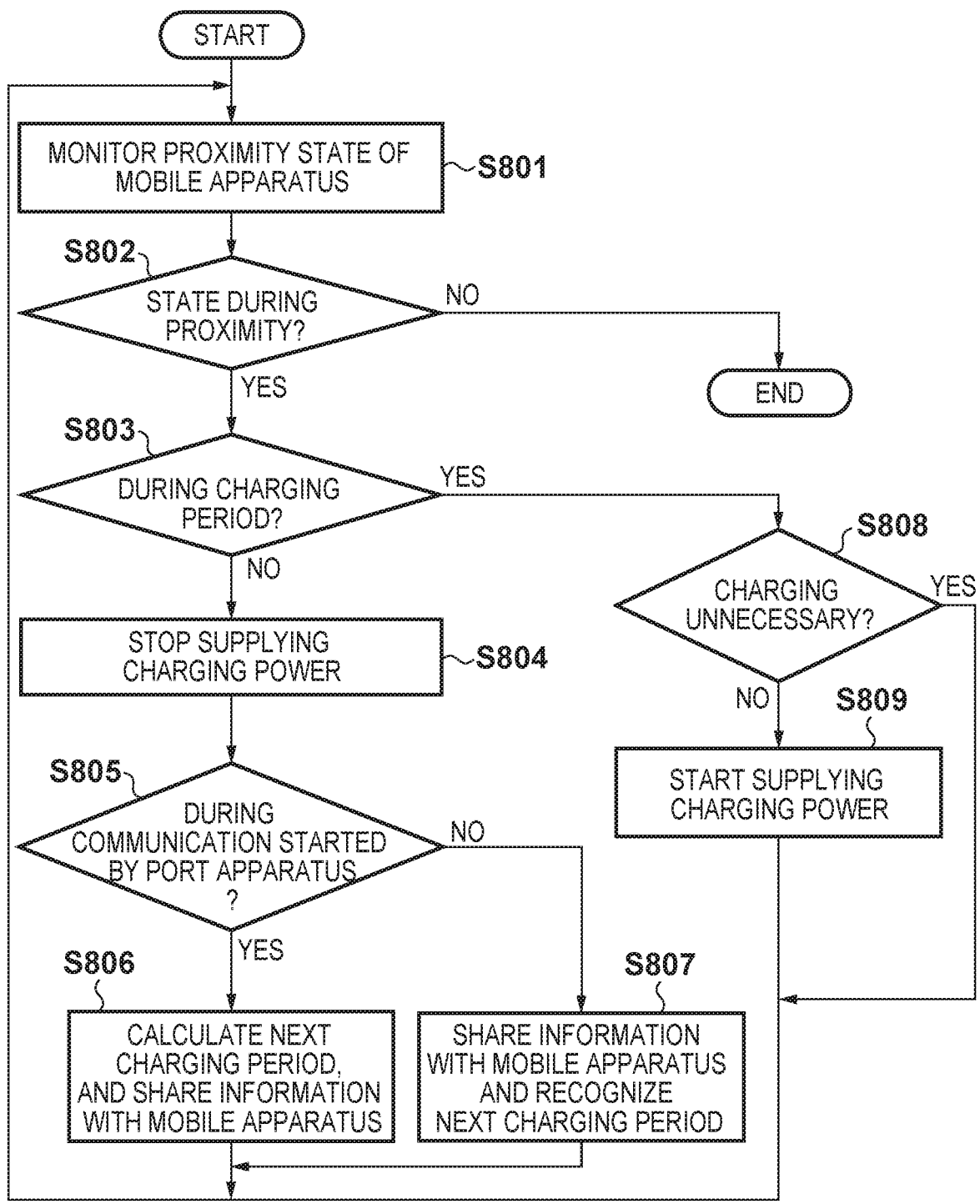
FIG. 8 is a flow chart showing the operation of power supply processing in a conventional communication apparatus.

FIGS. 4 and 6 show, chronologically, the contents of processing executed during the communication period 31 and the charging period (non-communication period 32). FIG. 7 is a flow chart showing the control operation of power supply of the port apparatus 1 according to the present embodiment. FIG. 8 is a flow chart showing the control operation of power supply of a conventional communication apparatus (corresponding to the port apparatus 1).

First, conventional power supply operation will be described with reference to FIG. 8. Initially, the communication apparatus is in a standby state for performing radio communication or power transmission between the communication apparatus and a partner apparatus (corresponding to the mobile apparatus 2). The port apparatus determines whether the mobile apparatus is present in a predetermined range in the standby state, i.e., whether the mobile apparatus is in proximity (S801 and S802). Then, if in proximity (YES in S802), the port apparatus determines whether it is presently (at the current time) in the charging period, i.e., whether it is presently in the non-communication period 32 (S803). Since the initial state is a state where information on the communication period 31 and the non-communication period 32 is not exchanged between the port apparatus and the mobile apparatus, it may be determined that the initial state corresponds to the non-communication period 32 without regard to the current time.

If the system is presently not in the non-communication period 32, power supply (charging) is not performed (S804). Then, the port apparatus determines whether the port apparatus has started radio communication (S805). Here, the case where the port apparatus has started radio communication refers to the case where the port apparatus communicates with the mobile apparatus by reading data from the mobile apparatus. Similarly, the case where the port apparatus has not started radio communication, i.e., the case where the mobile apparatus has started radio communication refers to the case where the mobile apparatus communicates with the port apparatus by transmitting data to the port apparatus.

Then, if the port apparatus has started radio communication (YES in S805), the port apparatus calculates the next charging period (non-communication period), and transmits the calculated result to the mobile apparatus. As a result, information on the next charging period is shared between the port apparatus and the mobile apparatus (S806). If radio communication is started by the port apparatus, since the port apparatus can recognize the amount of data to be read, the port apparatus can calculate the time necessary to read it. As described above, since the NFC data transmission period 30 is constant, the port apparatus can calculate the next non-communication period 32 based on the difference between the communication period 31 and the NFC data transmission period 30.

On the other hand, if radio communication has been started by the mobile apparatus (NO in S805), the port apparatus receives information on the charging period (non-communication period) transmitted from the mobile apparatus. As a result, information on the next charging period is shared between the port apparatus and the mobile apparatus (S807). If radio communication has not been started by the port apparatus, since the mobile apparatus can recognize the amount of data to be transmitted, it is possible to calculate the time (the communication period 31) necessary to transmit it. Moreover, since the NFC data transmission period 30 is constant, the mobile apparatus can calculate the next non-communication period 32 based on the difference between the communication period 31 and the NFC data transmission period 30. Moreover, the port apparatus receives information on the sleep period transmitted from the mobile apparatus, and thereby can recognize this period.

On the other hand, if the system is presently in the charging period in S803, i.e., if the system is presently in the non-communication period 32, the port apparatus confirms the necessity of charging (S808). If charging is necessary, the port apparatus supplies power to the mobile apparatus (S809). Then, the above-described processing continues until these apparatuses are not in proximity (NO in S802).

Hereinabove, as described, in conventional methods, the impact of power transmission on the NFC communication circuit in the mobile apparatus 2 is not taken into account. Therefore, in some cases, it is conceivable that high power is transmitted to the NFC communication circuit. In contrast to this, power supply control of the port apparatus 1 according to the present embodiment suppresses the impact on the NFC communication circuit by adding the processing indicated in S705 to S708 in FIG. 7. The processing in FIG. 7 will be described below. Since S701 to S704 and S709 to S713 in FIG. 7 correspond to S801 to S804 and S805 to S809 in FIG. 8, respectively, its description is omitted.

In the processing in FIG. 7, in the communication period 31 (NO in S703), configuration information on the power receiving circuit (charging circuit) and the communication circuit (configuration information in FIG. 2, FIG. 5, or the like) in the mobile apparatus 2 is confirmed (S705). The confirmation of this configuration information may be executed by the port apparatus 1 receiving the information directly from the mobile apparatus 2 during the communication period 31, or by the port apparatus 1 deriving the information based on information received from the mobile apparatus 2. For example, the port apparatus 1 holds a table of configuration information per device identification information in advance. Then, the port apparatus 1 receives device identification information from the mobile apparatus 2 and refers to the table using the device identification information, and thereby, configuration information may be confirmed. Then, it is determined whether or not the NFC chip 212 or 511, and the coil 210 or 510 can be blocked during the charging period (non-communication period 32), i.e., whether the communication circuit is affected due to power transmission (S706).

Then, as in FIG. 2, if blocking is possible (YES in S706), fast charging control is selected as charging control over the secondary battery 219 on the mobile apparatus 2 side (S707), and power having a large amount of power supply per unit time is transmitted for fast charging. On the other hand, as in FIG. 5, if blocking is impossible, long-time charging control is selected as charging control over a secondary battery 519 on the mobile apparatus 2 side (S708), and low power having the amount of power supply per unit time smaller than that in the case where blocking is possible is transmitted for long-time charging.

The operation of the port apparatus 1 and the mobile apparatus 2 in this case will be described with reference to FIGS. 4, 6 and 7. First, if a proximity state of the port apparatus 1 and the mobile apparatus 2 is detected (S401 and S601, and YES in S702), data communication is started (S402, S403, S602, and S603, and NO in S703). Then, information on the power receiving circuit (charging circuit) is exchanged in the data communication (S404, S604, and S705). Subsequently, the port apparatus 1 determines whether the communication circuit can be affected due to power transmission (S706), and selects a charging control method (S707 and S708). Subsequently, information on the charging period (non-communication period 32) is exchanged (S405, S605, and S709 to S711), data communication is ended due to the expiration of the communication period 31 (S406 and S606).

Then, if the charging control method selected by the port apparatus 1 is for fast charging, power is supplied from the port apparatus 1 to the mobile apparatus 2 by a charging control method providing a large amount of power supply per unit time as in FIG. 4 (S407). On the other hand, if the charging control method selected by the port apparatus 1 is for long-time charging, power is supplied from the port apparatus 1 to the mobile apparatus 2 by a charging control method providing a small amount of power supply per unit time as in FIG. 6 (S607). Subsequently, with the expiration of the charging period (non-communication period 32), the processing returns to the communication period 31, and data communication is resumed (S401 to S406, and S601 to S606). If communication is continuously performed, the port apparatus 1 and the mobile apparatus 2 may not execute the sharing of charging circuit information (S404) during the communication period 31 at the second and subsequent times as shown in FIG. 4.

By this kind of processing, since it is possible to obtain information on whether power transmission affects the NFC communication circuit on the partner apparatus side before the start of power transmission, it is possible to prevent, in advance, excessive power transmission to the NFC communication circuit in the partner apparatus.

If a power receiving function unit for contactless power transmission is not mounted on the mobile apparatus 2 side, long-time charging control may be selected as a charging control method by determining that it is impossible to block the NFC chip and the electromagnetic induction coil. By doing so, it is possible to minimize the impact on the NFC communication circuit due to the transmission of a large amount of power by assuming there is a power receiving function unit.

Embodiment 2

In Embodiment 1, an example has been described in which if it is possible to block the communication circuit and the coil, fast charging control is selected as charging control over the secondary battery 219 in the mobile apparatus 2 (S707), and if it is impossible, long-time charging control is selected as charging control (S708).

In the present embodiment, at the time of confirmation processing of the configuration information (in FIG. 2, FIG. 5, and so on) on the charging circuit (power receiving circuit) and the communication circuit on the mobile apparatus 2 side, power amount information is also obtained that includes the upper limit amount of power receivable by the communication circuit, and the amount of power requested by the charging circuit. Then, the power supply unit is controlled based on received information so that, for example, the amount of power supply corresponds to the requested power amount if it is possible to block the coil and the NFC chip, and in addition, the amount of power supply corresponds to not more than the upper limit amount notified if blocking is impossible.

Figure 9:
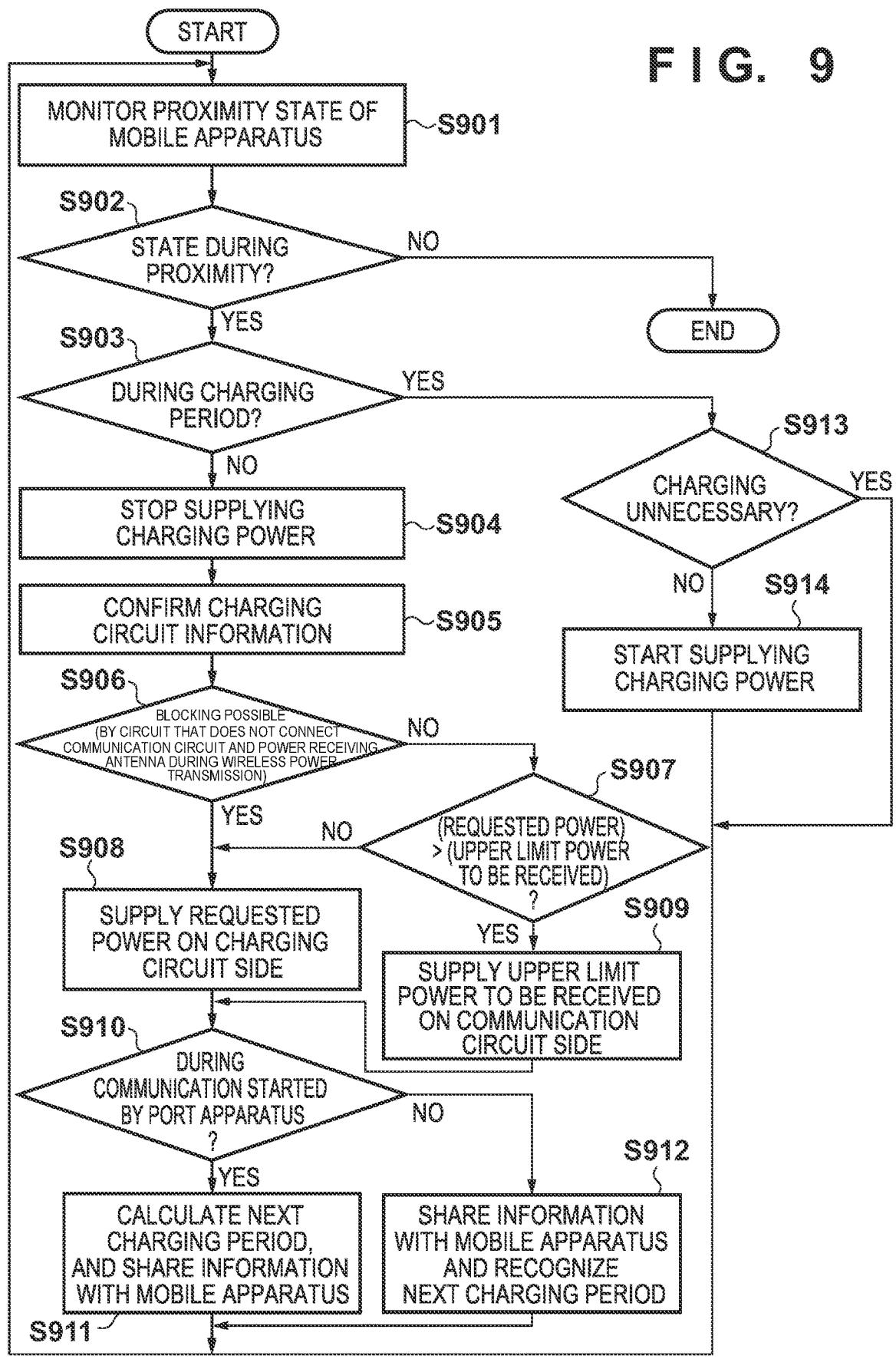
FIG. 9 is a flow chart showing the operation of power supply processing in a communication apparatus according to Embodiment 2.

FIG. 9 is a flow chart showing the operation of power supply processing in a communication apparatus (the port apparatus 1) according to the present embodiment. Since processing in S901 to S904 and S910 to S914 in FIG. 9 is the same as processing in S801 to S804 and S805 to S809 in FIG. 8, respectively, its description is omitted.

The port apparatus 1 according to the present embodiment obtains power amount information in addition to charging circuit information, and executes confirmation processing of configuration information on the charging circuit (power receiving circuit) and the communication circuit (configuration information in FIG. 2, FIG. 5, or the like) in the mobile apparatus 2 (S905). Then, the port apparatus 1 determines whether or not the NFC chip and the electromagnetic induction coil can be blocked during the charging period (non-communication period 32) (S906).

Then, if blocking is possible, the port apparatus 1 controls the power supply unit so that the amount of power supply to the secondary battery 219 in the mobile apparatus 2 corresponds to the amount of power requested by the charging circuit in the mobile apparatus 2 (S908). On the other hand, if blocking is impossible, the port apparatus 1 determines the magnitude relationship between the amount of power requested by the charging circuit and the upper limit amount of power of the communication circuit (S907). Then, if the upper limit amount of power is smaller than the requested power amount, the port apparatus 1 controls the power supply unit so that the amount of power supply to the secondary battery 519 in the mobile apparatus 2 corresponds to the upper limit amount of power receivable by the communication circuit in the mobile apparatus 2 (S909). Furthermore, if the upper limit amount of power is larger than the requested power amount, the port apparatus 1 controls the power supply unit so that the amount of power supply to the secondary battery 519 in the mobile apparatus 2 corresponds to the amount of power requested by the charging circuit in the mobile apparatus 2 (S908).

Thus, power is transmitted to the mobile apparatus 2 in a power amount of not more than the upper limit amount of power receivable by the communication circuit, and it is possible to prevent, in advance, excessive power transmission to the NFC communication circuit in the partner apparatus. Furthermore, if it is possible to block the coil and the communication circuit, since it is possible to supply power in the amount of power requested by the power receiving circuit, it is possible to supply power suitable for charging to the partner apparatus.

Furthermore, for example, in a charging control method for changing (for example, decreasing) the amount of power supply to the charging circuit according to the amount of power storage of the secondary battery 219 or 519, it is possible to supply a suitable amount of power of not more than a requested power amount even at the time when the amount of power supply decreases to less than allowable power of the NFC chip. Therefore, by the above-described control, it is possible to obtain a new effect of preventing overcharge to the secondary battery 519 in addition to the effect of prevention against damage to the NFC chip 511 on the mobile apparatus 2 side described in Embodiment 1.

If a power receiving function unit for contactless power transmission is not mounted in the mobile apparatus 2, the power supply unit may be controlled so that the amount of power supply corresponds to the upper limit amount of power of the communication circuit in the mobile apparatus 2 by determining that it is impossible to block the NFC chip and the coil. In this case, since there is no power receiving function unit, the port apparatus 1 may not be notified of a requested power amount, and in addition, the processing in S907 may also be omitted if the port apparatus 1 is not notified of a requested power amount.

Embodiment 3

In Embodiments 1 and 2, examples have been described in which the port apparatus 1 and the mobile apparatus 2 perform data transmission and power transmission by near field radio communication in a time-division manner. In the present embodiment, a communication apparatus obtains a power receiving profile of a partner apparatus using data transmission by near field radio communication prior to power transmission, and transmits power in the amount of power corresponding to the power receiving profile after the completion of communication. Moreover, the communication apparatus monitors the charging state of the partner apparatus, determines whether the state is a state where power is not received, and stops power supply according to the determination result. This processing will be described with reference to FIG. 10 to FIG. 13 below.

Figure 10:
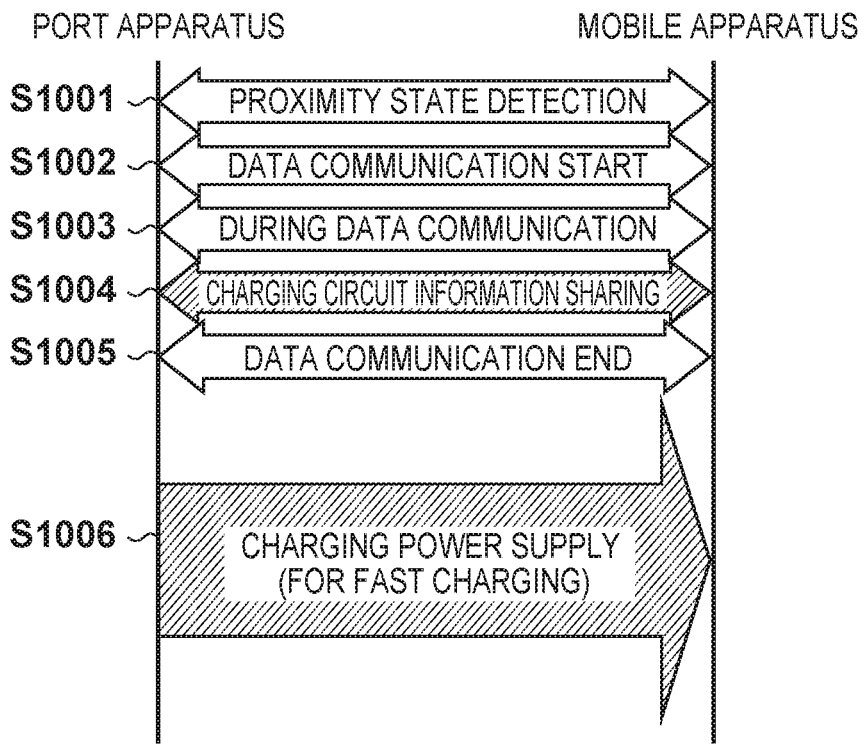
FIG. 10 is a sequence chart showing processing between a communication apparatus and a partner apparatus according to Embodiment 3 in a case where the impact of power transmission can be blocked in the partner apparatus.
Figure 11:
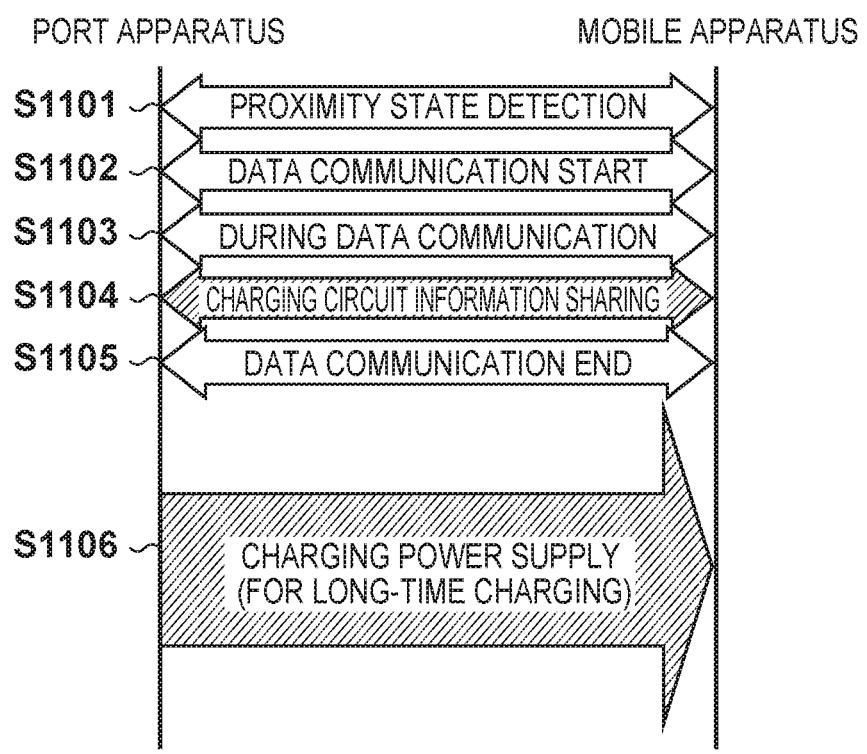
FIG. 11 is a sequence chart showing processing between a communication apparatus and a partner apparatus according to Embodiment 3 in a case where the impact of power transmission cannot be blocked in the partner apparatus.
Figure 12:
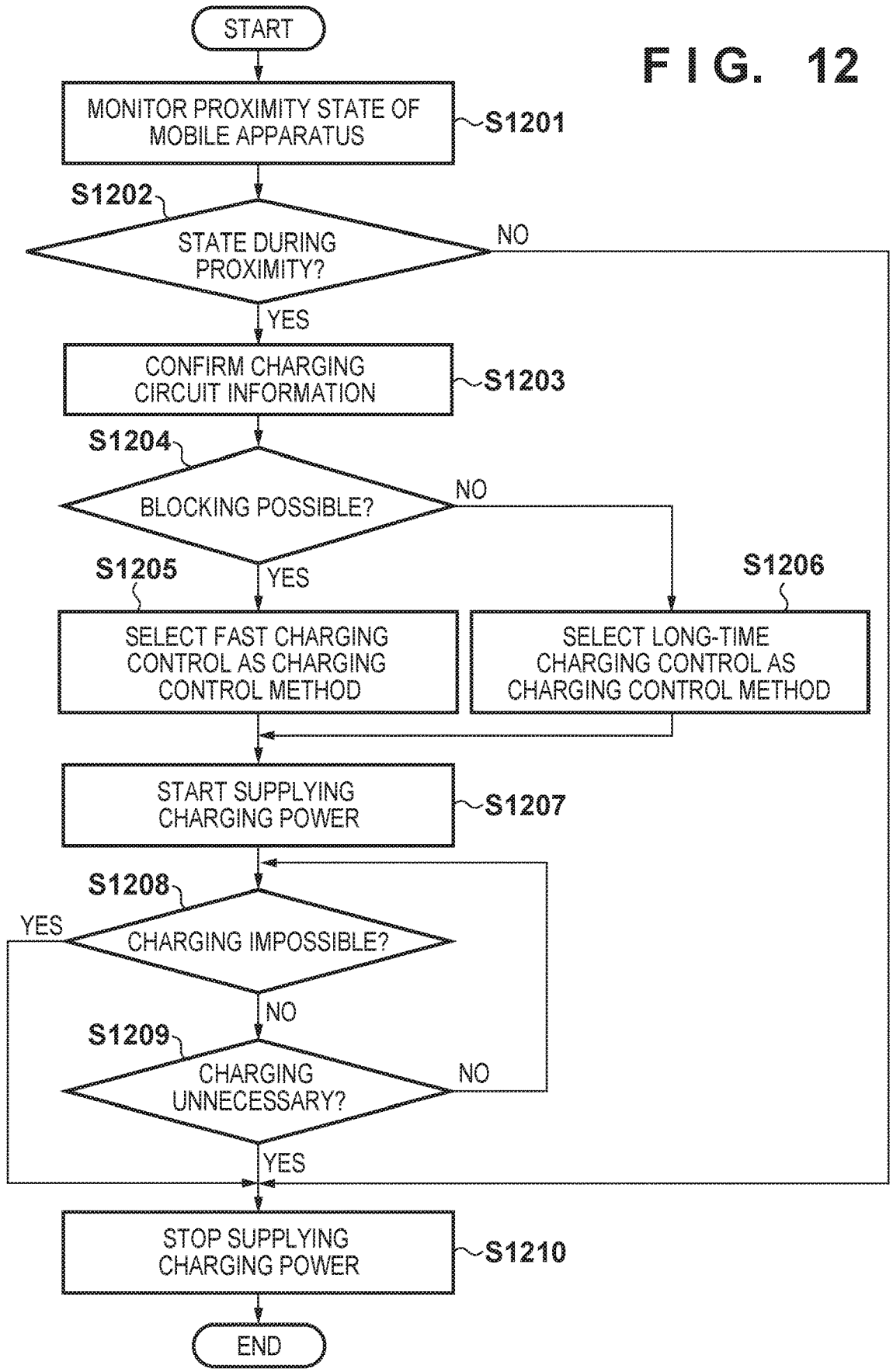
FIG. 12 is a flow chart showing the operation of power supply processing in a communication apparatus according to Embodiment 3.
Figure 13:
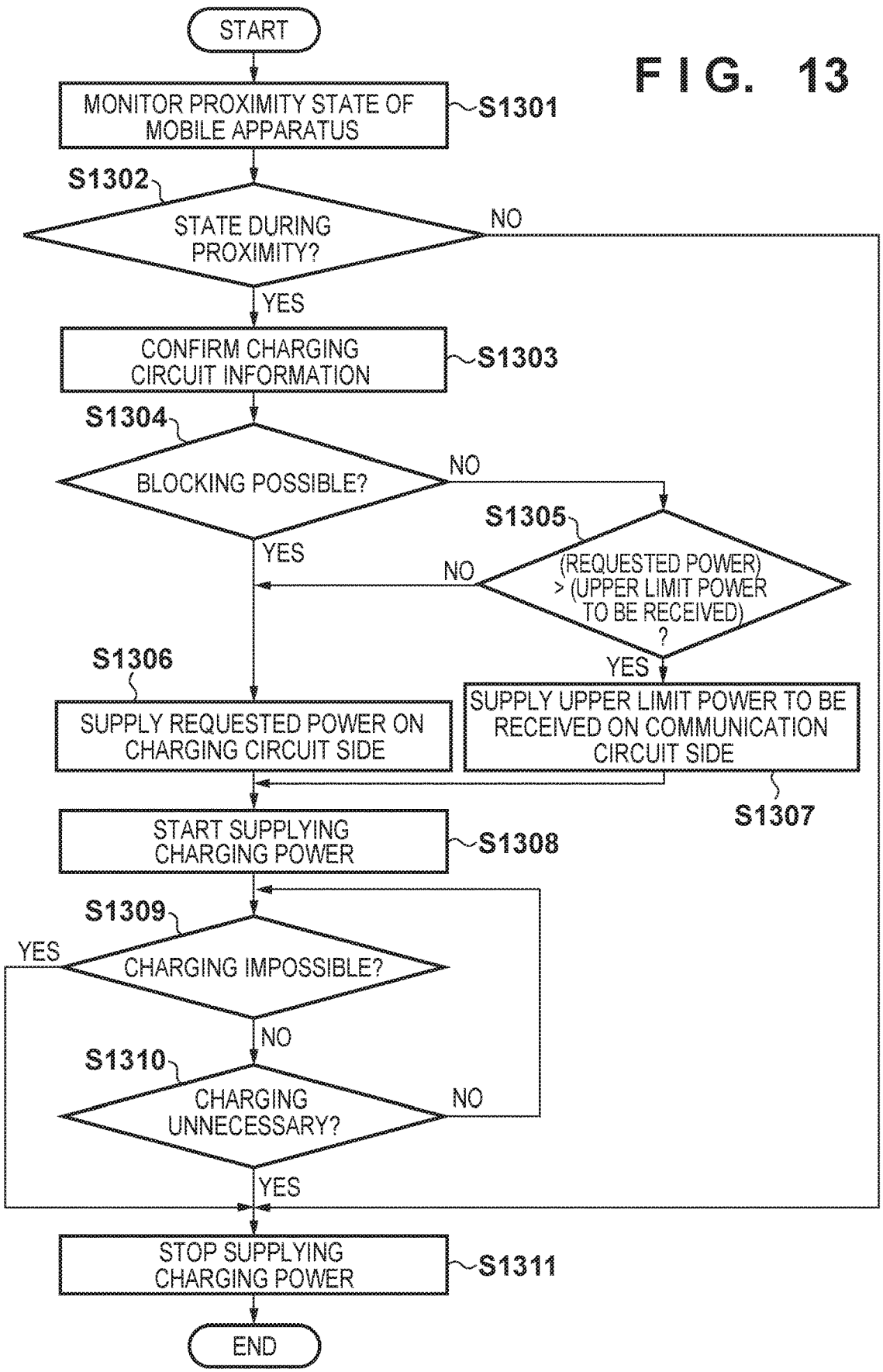
FIG. 13 is a flow chart showing the operation of power supply processing in a communication apparatus according to Embodiment 3.

FIGS. 10 and 11 are sequence charts showing processing between the port apparatus 1 and the mobile apparatus 2. FIGS. 12 and 13 are flow charts showing the operation of power supply processing of the port apparatus 1 according to the present embodiment. Hereinafter, the difference from Embodiments 1 and 2 will be described in detail.

In the present embodiment, as described above, for example, the transmission of power in the amount of power corresponding to a power receiving profile obtained in S1004 is started (S1006, or S1106) after the completion of data communication (S1001 to S1005) between the port apparatus 1 and the mobile apparatus 2. The port apparatus 1 monitors the characteristics (inductance and the like) of the coil (200 or 500) in the port apparatus 1 after the start (S1207 or S1308) of power transmission, and determines whether the mobile apparatus 2 is in a state where the mobile apparatus 2 does not receive power, i.e., whether the mobile apparatus 2 is in a state where the mobile apparatus 2 cannot perform charging. For example, the port apparatus 1 determines that the proximity state between the apparatuses is collapsed and the apparatuses are in a non-chargeable state, in the case of occurrence of a rapid change such that the absolute value of the amount of change of the inductance per unit time exceeds a predetermined value, or the like (S1208, or S1309). When the mobile apparatus 2 is in the non-chargeable state, the port apparatus 1 controls the power supply unit so as to stop power supply (S1210 or S1311).

Furthermore, the port apparatus 1 may be notified of the charging state of the mobile apparatus 2 with a power receiving profile. Moreover, if the secondary battery in the mobile apparatus 2 is in a full charge state (YES in S1209 or S1310), the port apparatus 1 may control the power supply unit so as to stop power supply. The determination of whether the secondary battery is in the full charge state may be performed by the port apparatus 1 monitoring the inductance of its own coil and determining whether the value of the inductance has reached a certain value (target value) of the inductance that is expected to be obtained in the full charge state. Furthermore, the port apparatus 1 may be notified of the target value with a power receiving profile.

This kind of control can prevent the port apparatus 1 from continuing unnecessary power supply. Furthermore, it is possible to prevent the mobile apparatus 2 from receiving power unnecessary in the full charge state.

Even when communication and charging are alternately performed in a time-division manner, processing according to the present embodiment may be executed. That is, by determining whether the secondary battery is in the non-chargeable state or in the full charge state in the charging period, power supply may be stopped according to the determination result. Furthermore, if communication is disconnected in the communication period, since it may be determined that the proximity state of the port apparatus 1 and the mobile apparatus 2 is released, the port apparatus 1 may also stop power supply in this case.

In the above description, cases have been described in which near field radio communication (Near Field Communication defined in ISO/IEC18092) operated by induced electromotive force from a partner apparatus is used as an NFC interface, and electromagnetic induction that is the same as that of communication is also used for power transmission. However, the interfaces are not limited to this, and the above-described control may be performed using charge coupling methods, magnetic resonance methods, or the like other than electromagnetic induction methods that can execute power transmission and data transmission in proximity without contact.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-055417, filed Mar. 18, 2013, which is hereby incorporated by reference herein in its entirety.

The invention claimed is:

1. A power transmission apparatus for wirelessly transmitting power to a power receiving apparatus, comprising:
   one or more memories storing instructions; and
   one or more processors executing the instructions for causing the power transmission apparatus to:
   obtain first information for specifying an upper limit value of power which is able to be received by a power receiving apparatus and second information for specifying power requested by the power receiving apparatus;
   determine, based on the obtained first information for specifying the upper limit value of power which is able to be received by the power receiving apparatus, whether to allow wireless power transmission with power exceeding a predetermined power value to the power receiving apparatus; and
   perform, based on a determination not to allow the wireless power transmission with power exceeding the predetermined power value, the wireless power transmission to the power receiving apparatus according to the requested power specified based on the obtained second information as long as the power does not exceed the predetermined power value,
   wherein the one or more processors executes the instructions for causing the power transmission apparatus to determine to allow the wireless power transmission with power exceeding the predetermined power value, based on the obtained first information including information representing that the power receiving apparatus includes a circuit that does not connect a communication circuit and a power receiving antenna during wireless power transmission.

2. The power transmission apparatus according to claim 1, wherein the one or more processors executes the instructions for causing the power transmission apparatus to perform, based on a determination to allow the wireless power transmission with power exceeding the predetermined power value, the wireless power transmission to the power receiving apparatus according to the requested power specified based on the obtained second information regardless of whether the power exceeds or does not exceed the predetermined power value.

3. The power transmission apparatus according to claim 1, wherein the one or more processors executes the instructions for causing the power transmission apparatus to perform, based on the determination not to allow the wireless power transmission with power exceeding the predetermined power value, the wireless power transmission with power not exceeding the requested power specified based on the obtained second information in a case where a value of the requested power is smaller than the predetermined power value and the wireless power transmission with power not exceeding the predetermined power value even if the value of the requested power is larger than the predetermined power value.

4. The power transmission apparatus according to claim 1, wherein the one or more processors executes the instructions for causing the power transmission apparatus not to suppress the wireless power transmission with power exceeding the predetermined power value based on a determination to allow the wireless power transmission with power exceeding the predetermined power value.

5. The power transmission apparatus according to claim 1, wherein the one or more processors executes the instructions for causing the power transmission apparatus to determine not to allow the wireless power transmission with power exceeding the predetermined power value, based on the obtained first information not including information representing that the power receiving apparatus includes a circuit that does not connect a communication circuit and a power receiving antenna during wireless power transmission.

6. A method for controlling a power transmission apparatus for wirelessly transmitting power to a power receiving apparatus, comprising:
   obtaining first information for specifying an upper limit value of power which is able to be received by a power receiving apparatus and second information for specifying power requested by the power receiving apparatus;

determining, based on the obtained first information for specifying the upper limit value of power which is able to be received by the power receiving apparatus, whether to allow wireless power transmission, with power exceeding a predetermined power value to the power receiving apparatus; and performing, based on a determination not to allow the wireless power transmission with power exceeding the predetermined power value, the wireless power transmission to the power receiving apparatus according to the requested power specified based on the obtained second information as long as the power does not exceed the predetermined power value, wherein, determining that the wireless power transmission, with power exceeding the predetermined power value, is allowed is based on the obtained first information including information representing that the power receiving apparatus includes a circuit that does not connect a communication circuit and a power receiving antenna during wireless power transmission.

7. The method according to claim 6, wherein the wireless power transmission to the power receiving apparatus is performed based on a determination to allow the wireless power transmission with power exceeding the predetermined power value, according to the requested power specified based on the obtained second information regardless of whether the power exceeds or does not exceed the predetermined power value.

8. The method according to claim 6, wherein the wireless power transmission with power not exceeding the requested power specified based on the obtained second information in a case where a value of the requested power is smaller than the predetermined power value and the wireless power transmission with power not exceeding the predetermined power value even if the value of the requested power is larger than predetermined power value is performed, based on the determination not to allow the wireless power transmission with power exceeding the predetermined power value.

9. The method according to claim 6, wherein the wireless power transmission to the power receiving apparatus with power exceeding the predetermined power value is not suppressed based on a determination to allow the wireless power transmission with power exceeding the predetermined power value is transmitted.

10. The method according to claim 6, wherein, determining that the wireless power transmission, with power exceeding the predetermined power value, is not allowed, is based on the obtained first information not including information representing that the power receiving apparatus includes a circuit that does not connect a communication circuit and a power receiving antenna during wireless power transmission.

11. A non-transitory computer readable storage medium storing a computer program for controlling a computer to execute a method for controlling a power transmission apparatus for wirelessly transmitting power to a power receiving apparatus, comprising:

obtaining first information for specifying an upper limit value of power which is able to be received by a power receiving apparatus and second information for specifying power requested by the power receiving apparatus;

determining, based on the obtained first information for specifying the upper limit value of power which is able to be received by the power receiving apparatus, whether to allow wireless power transmission, with power exceeding a predetermined power value, to the power receiving apparatus; and performing, based on a determination not to allow the wireless power transmission with power exceeding the predetermined power value, the wireless power transmission to the power receiving apparatus according to the requested power specified based on the obtained second information as long as the power does not exceed the predetermined power value, wherein, determining that the wireless power transmission, with power exceeding the predetermined power value, is allowed is based on the obtained first information including information representing that the power receiving apparatus includes a circuit that does not connect a communication circuit and a power receiving antenna during wireless power transmission.

\* \* \* \* \*